United States Patent
Yasuda

(10) Patent No.: US 8,026,975 B2
(45) Date of Patent: Sep. 27, 2011

(54) IMAGE CAPTURING APPARATUS AND CONTROL METHOD THEREFOR

(75) Inventor: Hitoshi Yasuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 360 days.

(21) Appl. No.: 12/415,502

(22) Filed: Mar. 31, 2009

(65) Prior Publication Data

US 2009/0251590 A1 Oct. 8, 2009

(30) Foreign Application Priority Data

Apr. 7, 2008 (JP) ................................. 2008-099805

(51) Int. Cl.
*G03B 13/00* (2006.01)
(52) U.S. Cl. .......................................... 348/354; 396/80
(58) Field of Classification Search .................. 348/345, 348/348, 349, 354; 396/72, 79, 80, 89, 93
See application file for complete search history.

(56) References Cited

U.S. PATENT DOCUMENTS

| 2006/0182433 A1 | 8/2006 | Kawahara et al. |
| 2008/0012949 A1 | 1/2008 | Kobayashi |

FOREIGN PATENT DOCUMENTS

| JP | 2001-215403 | 8/2001 |
| JP | 2002-251380 | 9/2002 |
| JP | 2006-227080 | 8/2006 |
| JP | 2007-212724 | 8/2007 |

*Primary Examiner* — Clayton E Laballe
*Assistant Examiner* — Autumn Parker
(74) *Attorney, Agent, or Firm* — Cowan, Liebowitz & Latman, P.C.

(57) ABSTRACT

In an image capturing apparatus for carrying out TV-AF type autofocus control, a difference is provided between an AF frame set for a particular object detected in an image, for example, for a person's face, and a normal AF frame in the band of frequency components for use in the generation of an AF evaluation value. Specifically, an AF evaluation value is generated for the AF frame set in the face region based on components in a frequency band with the highest frequency lower than for the normal AF frame.

6 Claims, 12 Drawing Sheets

IMAGE CAPTURING APPARATUS AND CONTROL METHOD THEREFOR

BACKGROUND OF THE INVENTION

1. Field of the Invention

The present invention relates to an image capturing apparatus and a control method for the image capturing apparatus, and more particularly, to an image capturing apparatus for carrying out autofocus control and a control method for the image capturing apparatus.

2. Description of the Related Art

For autofocus (AF) control of video cameras and the like, TV-AF type AF control is widely used in which an in-focus position is detected on the basis of the sharpness (contrast) of image signals generated with the use of an image sensor. Specifically, an AF evaluation value indicating the degree of contrast is generated for image signals captured sequentially while moving a focus lens, and the position of the focus lens at which the contrast reaches its maximum is searched as an in-focus position on the basis of the AF evaluation value.

However, in the case of shooting a person, focusing on the background rather than the person may occur due to the relationship in contrast between the person as a main object and the background.

In order to solve such a problem, image capturing apparatus are known that detect a person and set a focus detection area for the purpose of focusing on the person. For example, image capturing apparatuses which have a face detection function and carry out focus detection for a focus detection area containing a face region (for example, Japanese Patent Laid-Open No. 2006-227080), and image capturing apparatuses which detect a person's eyes and carry out focus detection on the basis of the eyes (for example, Japanese Patent Laid-Open No. 2001-215403) are proposed.

In conventional TV-AF type AF control, high frequency components of image signals are extracted with a filter or the like for use as AF evaluation values. However, the extracted band stays constant regardless of the type of object, and is set wider such that focusing on any object can be carried out.

However, when the band of the extracted high frequency components is wider, needlessly high frequency components will be included depending on the object. On the other hand, while the AF evaluation value is susceptible to the influence of high frequency components, such high frequency components vary significantly with a subtle movement of the object. Therefore, in a case in which high frequency components are extracted which are unnecessary for the object under normal circumstances, the increase and decrease of the unnecessary frequency components may result in inconsistent AF evaluate values, negatively affecting the speed and accuracy of AF.

SUMMARY OF THE INVENTION

The present invention is conceived in light of the problems of the conventional art described above, and provides an image capturing apparatus for carrying out TV-AF type autofocus control that allows a more consistent AF control value to be obtained, and a control method for the image capturing apparatus.

According to one aspect of the present invention, there is provided an image capturing apparatus for driving a focus lens based on an AF evaluation value obtained from a captured image to carry out autofocus control, comprising: a detection unit which detects a particular object from a captured image; a setting unit which set a focus detection area for the image; a generating unit which generates an AF evaluation value based on a component in a predetermined frequency band contained in the focus detection area of the image; and a control unit which drives the focus lens based on the AF evaluation value, wherein the setting unit sets the focus detection area for a region of the particular object in a case in which the particular object is detected by the detection unit, and sets the focus detection area for a region in a predetermined position and of a predetermined size in a case in which the predetermined object is not detected by the detection unit, and wherein, in a case in which the focus detection area is set in the region of the particular object, the generating unit generates the AF evaluation value based on a component in a frequency band with the highest frequency lower than in a case in which the focus detection area is set in the region in the predetermined position and of the predetermined size.

According to another aspect of the present invention, there is provided a control method for an image capturing apparatus comprising control unit for driving a focus lens based on an AF evaluation value obtained from a captured image to carry out autofocus control, comprising: a detection step of detecting a particular object from a captured image; a setting step of setting a focus detection area for the image; and a generation step of generating an AF evaluation value based on a component in a predetermined frequency band contained in the focus detection area for the image, wherein the setting step sets the focus detection area for a region of the particular object in a case in which the particular object is detected in the detection step, and sets the focus detection area for a region in a predetermined position and of a predetermined size in a case in which the particular object is not detected in the detection step, and wherein, in a case in which the focus detection area is set in the region of the particular object, the generation step generates the AF evaluation value based on a component in a frequency band with the highest frequency lower than in a case in which the focus detection area is set in the region in the predetermined position and of the predetermined size.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1:
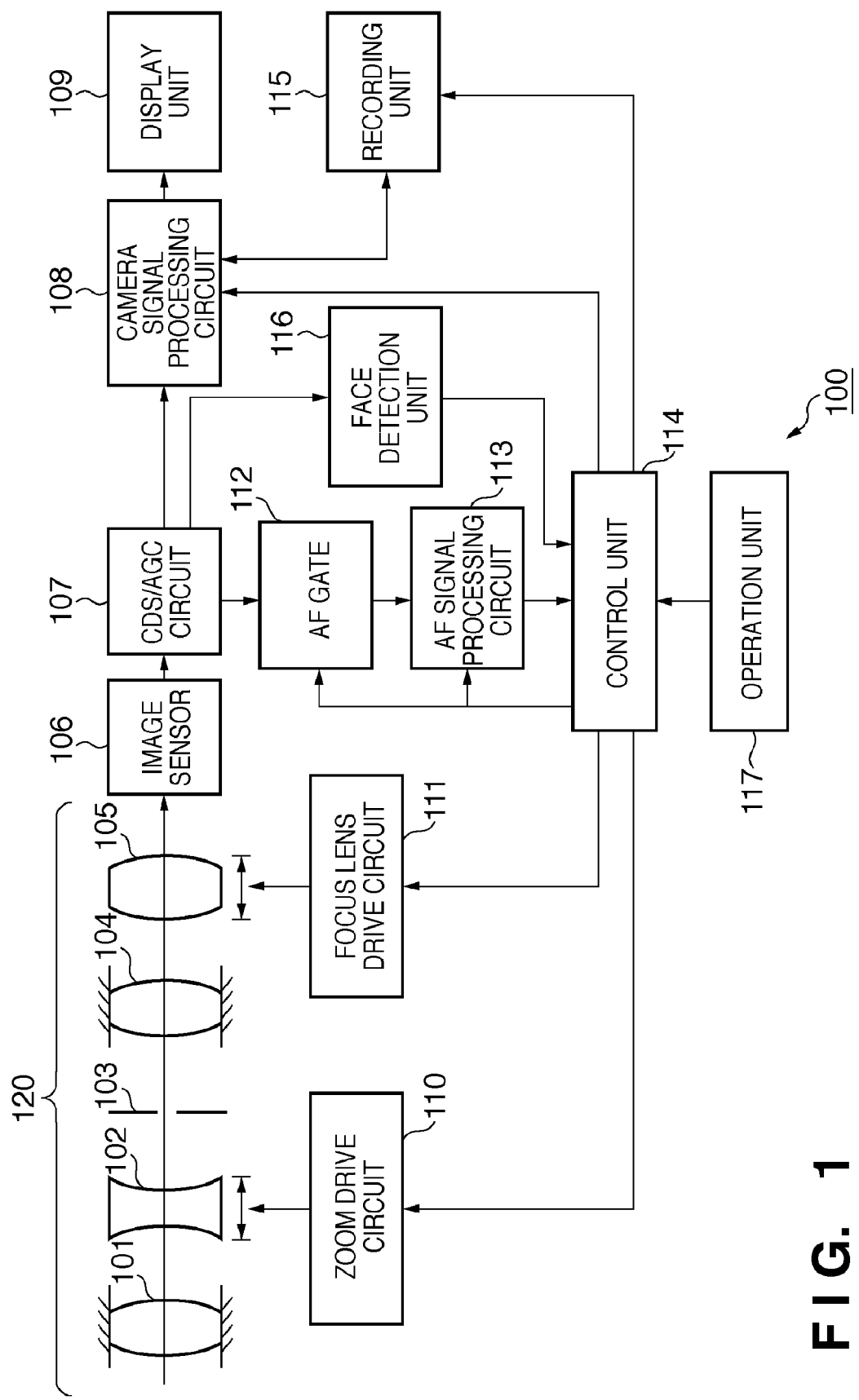
FIG. 1 is a block diagram illustrating a configuration example of a digital video camera 100 as an example of an image capturing apparatus according to a first embodiment of the present invention.

FIG. 1 is a block diagram illustrating a configuration example of a digital video camera 100 as an example of an image capturing apparatus according to a first embodiment of the present invention. It is to be noted that the present invention can also be applied to digital still cameras, as well as any other image capturing apparatuses which have a face detection function and a movie-capturing function and equipment including such an image capturing apparatus.

In FIG. 1, the digital video camera 100 according to the present embodiment includes, as an image capturing optical system, a zoom lens 120 which has an autofocus function. The zoom lens 120 includes a first fixed lens 101, a magnification lens 102 for moving in the optical axis direction to vary the magnification of an optical image, an aperture 103, a second fixed lens 104, and a focus compensator lens 105. The focus compensator lens (hereinafter simply referred to as a focus lens) 105 has both a function of correcting displacement of the focal plane with variable power and a focusing function.

An image sensor 106 is composed of a photoelectric conversion device such as a CCD image sensor or a CMOS image sensor. A CDS/AGC circuit 107 carries out correlated double sampling of and gain adjustment of the output from the image sensor 106.

A camera signal processing circuit 108 applies various types of image processing to the output signal from the CDS/AGC circuit 107 to generate an image signal. A display unit 109 is composed of an LCD or the like, which displays the image signal from the camera signal processing circuit 108. A recording unit 115 records the image signal from the camera signal processing circuit 108 on a recording medium (a magnetic tape, an optical disc, a semiconductor memory, etc.).

A zoom drive circuit 110 moves the magnification lens 102 in response to control exercised by the control unit 114. A focus lens drive circuit 111 moves the focus lens 105 in response to control exercised by the control unit 114. The zoom drive circuit 110 and the focus lens drive circuit 111 are composed of an actuator such as a stepping motor, a DC motor, a vibrating motor, and a voice coil motor.

An AF gate 112 supplies, to an AF signal processing circuit 113 at a subsequent stage, only signals in an area to be used for focus detection(a focus detection area or an AF frame) set by the control unit 114 from among output signals for all of the pixels from the CDS/AGC circuit 107.

The AF signal processing circuit 113 applies a filter to the pixel signals in the focus detection area supplied from the AF gate 112 to extract a high-frequency component and generate an AF evaluation value. As described below, the AF signal processing circuit 113 according to the present embodiment has a filter with multiple frequency characteristics or a filter with variable frequency characteristics. Then, in accordance with the settings by the control unit 114, the AF signal processing circuit 113 uses a filter with different characteristics to generate an AF evaluation value depending on whether or not a face region is contained in the focus detection area.

The AF evaluation value is output to the control unit 114. The AF evaluation value refers to a value representing the sharpness (the level of contrast) of an image generated on the basis of the output signal from the image sensor 106. However, the AF evaluation value can be utilized as a value representing the focus state of the image capturing optical system, because the sharpness of an in-focus image is higher whereas the sharpness of an out-of-focus image is lower.

The control unit 114 is, for example, a microcomputer, which controls operation of the entire digital video camera 100 by executing a control program stored in advance in a ROM, not shown, to control each unit of the digital video camera 100. The control unit 114 controls, based on the AF evaluation value provided from the AF signal processing circuit 113, the focus lens drive circuit 111 to carry out AF control (autofocus control) operation. Furthermore, in accordance with a zoom request from an operation unit 117 described below, the control unit 114 controls the zoom drive circuit 110 to vary the magnification of the zoom lens 120.

A face detection unit 116 applies face detection processing based on a known face detection technique to the image signal output by the CDS/AGC circuit 107 to detect a face region as an example of a person region in the image. Known face detection techniques include a learning-based approach utilizing a neural network or the like, and an approach in which template matching is used to search for a distinctively shaped site, such as an eye, a nose, and a mouth, from an image, and treats the site as a face if the degree of similarity is high. In addition, many other approaches have been proposed, such as an approach of detecting the image feature quantity such as the color of skin and the shape of an eye and using a statistical analysis. In general, two or more of these approaches are combined to improve the accuracy of focus detection. Specific examples include a method of utilizing the wavelet transform described in Japanese Patent Laid-Open No. 2002-251380 and the image feature quantity to carry out face detection.

The face detection unit 116 outputs information to the control unit 114 as a face detection result, with which the position and size of the region detected as, for example, a person's face (face region) can be identified in the image. Based on this face detection result, the control unit 114 directs the AF gate 112 to set a focus detection area in a region containing the face region in the image.

The operation unit 117 refers to a group of input devices such as a switch, a button, and a dial for the user to input a variety of requests and settings to the digital video camera 100. The operation unit 117 includes a shooting start/pause button, a zoom switch, a still image capturing button, a direction button, a menu button, an execution button, etc.

Figure 2:
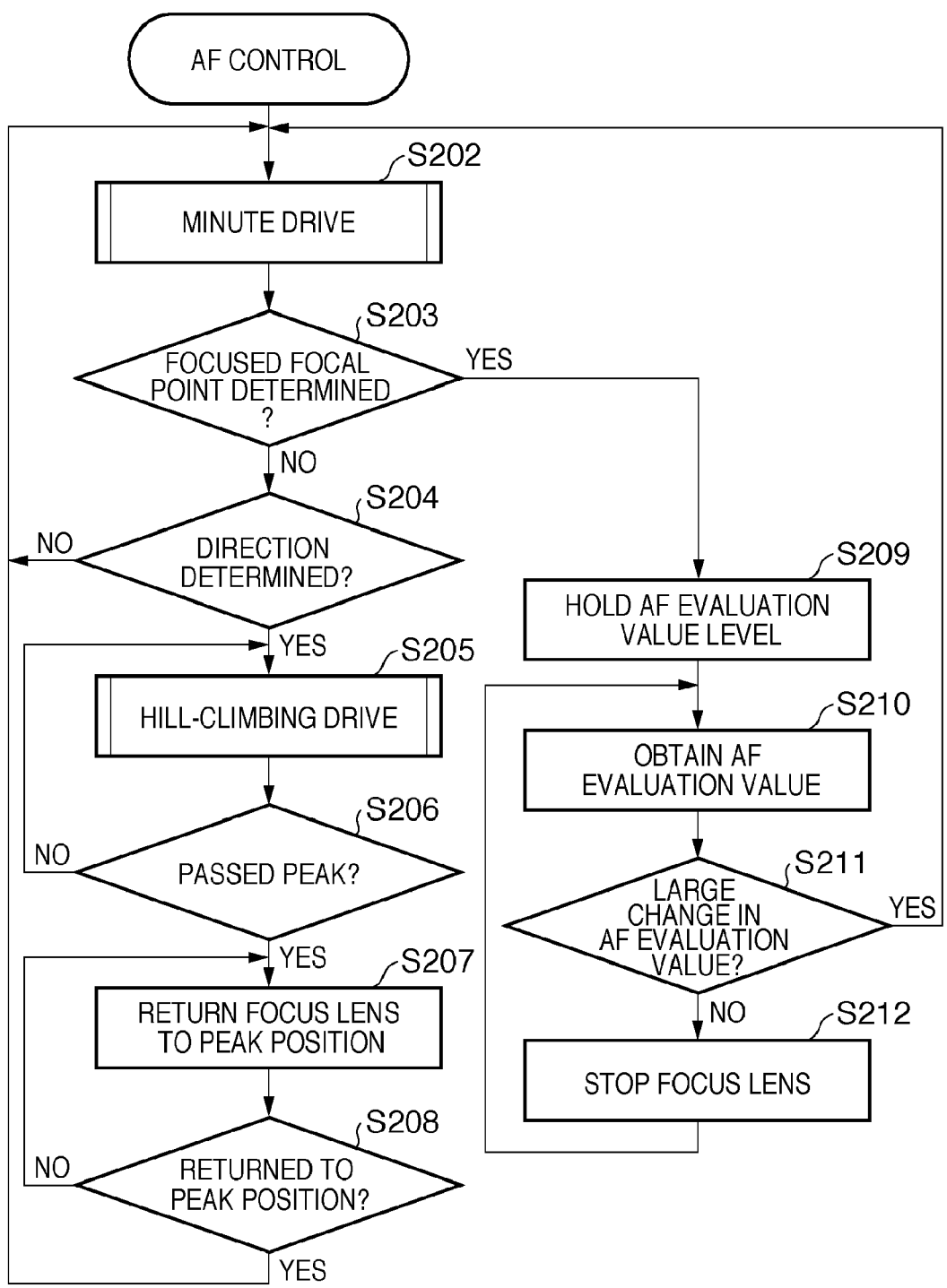
FIG. 2 is a flowchart showing details of AF control exercised by a control unit 114 in the first embodiment of the present invention.

Next, details of AF control executed by the control unit 114 will be described with reference to a flowchart shown in FIG. 2.

In S202, the control unit 114 carries out a minute drive operation and determines whether the state corresponds to an in-focus state, and if not, which direction in terms of perspective the focused focal point is located in. Details of the minute drive operation will be described below with reference to FIG. 3.

In S203, the control unit 114 bifurcates the processing, depending on the determination result in S202. In a case in which the minute drive operation in S202 determines that the state corresponds to an in-focus state, the control unit 114 proceeds with the processing to S209, or to S204 if not.

In S204, the control unit 114 further bifurcates the processing, depending on whether or not the direction of the focused focal point has been determined in S202. More specifically, if the direction has been determined, the control unit 114 proceeds with the processing to S205, or if not, the control unit 114 returns the processing to S202 to continue the minute drive operation.

In S205, the control unit 114 controls the focus lens drive circuit 111, and applies a hill-climbing drive operation to the focus lens at high speed in the direction in which the AF evaluation value is increased. Details of the hill-climbing drive operation will be described below with reference to FIG. 5.

In S206, the control unit 114 determines whether or not the AF evaluation value has passed the peak value in the hill-climbing drive operation in S205. If it is determined that the AF evaluation value has passed the peak value, the control unit 114 proceeds with the processing to S207, or if not, the control unit 114 continues the hill-climbing drive operation in S205.

In S207, the control unit 114 controls the focus lens drive circuit 111, and returns the focus lens 105 to the lens position at which the AF evaluation value obtained during the hill-climbing drive operation assumes its peak value. In S208, the control unit 114 checks whether or not the focus lens 105 has been returned to the position at which the AF evaluation value is at its maximum value. Then, if the focus lens 105 has been returned, the control unit 114 returns the processing to S202 to continue the minute drive operation. If the focus lens 105 has not been returned, the control unit 114 returns the processing to S207 to continue the operation for returning the position of the focus lens 105.

Next, focusing operation from S209 will be described.

In S209, the control unit 114 holds the AF evaluation value from the AF signal processing circuit 113. In S210, the control unit 114 obtains the latest AF evaluation value from the AF signal processing circuit 113. In S211, the control unit 114 compares the AF evaluation value held in S209 with the AF evaluation value newly obtained in S210 to determine whether or not the change in the AF evaluation value is large. Specifically, if the difference between the AF evaluation values is a predetermined value or more, the control unit 114 determines that the change is large, and returns the processing to S202 to restart minute drive operation. On the other hand, if it is not determined that the change in the AF evaluation value is large, the control unit 114 controls the focus lens drive circuit 111 to stop the focus lens 105 in S212, and returns the processing to S210.

Next, the minute drive operation carried out in S202 of FIG. 2 will be described with reference to a flowchart shown in FIG. 3.

In S302, the control unit 114 obtains the latest face detection result. Then, the control unit 114 determines an AF frame (focus detection area) depending on whether or not there is any detected face region, and sets the AF gate 112 so as to supply only pixel signals within the determined AF frame to the AF signal processing circuit 113. In addition, the control unit 114 sets the frequency characteristics of the filter for use in the AF signal processing circuit 113 depending on whether or not any face region is contained in the AF frame. Furthermore, the control unit 114 obtains an AF evaluation value which is generated by the AF signal processing circuit 113 on the basis of the pixel signals within the AF frame. It is to be noted that details of the processing in S302 will be described below with reference to FIG. 7.

In S303, the control unit 114 determines whether or not the AF evaluation value obtained in S302 is larger than the previously obtained AF evaluation value. Then, if the currently obtained AF evaluation value is the previously obtained AF evaluation value or less, the control unit 114, in S305, controls the focus lens drive circuit 111 to move the focus lens 105 by a predetermined amount in a direction opposite to the previous direction.

On the other hand, if the currently obtained AF evaluation value is greater than the previously obtained AF evaluation value, the control unit 114, in S304, controls the focus lens drive circuit 111 to further move the focus lens 105 by a predetermined amount in the same direction as the previous direction.

In S306, the control unit 114 checks the determination result for the magnitude correlation of the AF evaluation result in S303, or whether or not the driving direction of the focus lens 105 has been changed a predetermined continuous number of times, that is, whether or not the direction determined to be an in-focus direction has been the same direction a predetermined number of times. If the direction determined to be an in-focus direction has not been changed a predetermined continuous number of times, the control unit determines, in S307, that the direction has been determined, and terminates the minute drive operation.

On the other hand, in a case in which the direction determined to be an in-focus direction is not the same a predetermined continuous number of times, the control unit 114 determines in S308 whether or not the position of the focus lens 105 moves reciprocally within the same range a predetermined number of times. Alternatively, whether or not the position of the focus lens 105 is within a predetermined range for a predetermined period of time can be determined. In a case in which it is determined that either condition is satisfied, the control unit 114 determines in S309 that the focused focal point has been determined and terminates the minute drive operation. In a case in which neither condition is satisfied in S308, the control unit 114 determines that neither the direction nor the focused focal point has been determined and terminates the minute drive operation.

Figure 4:
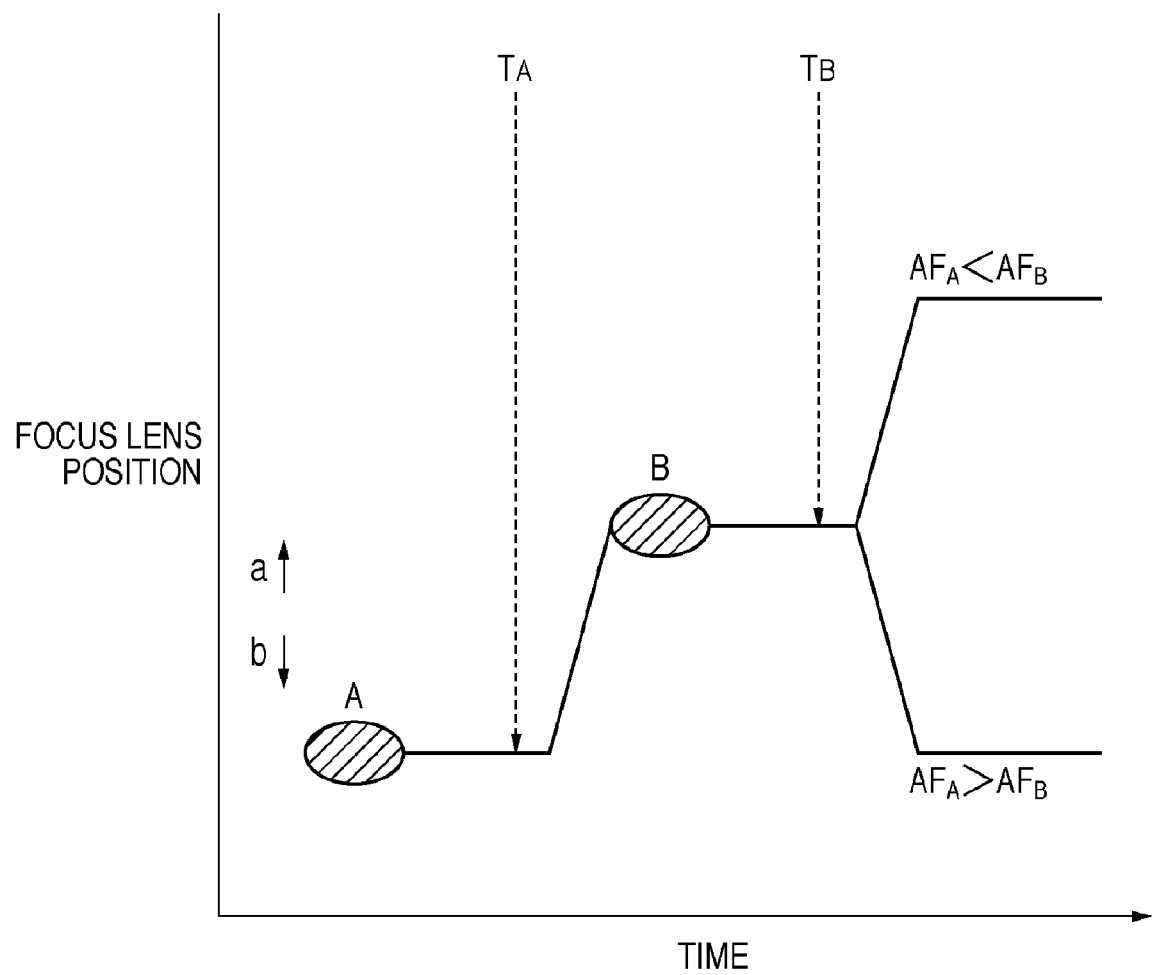
FIG. 4 is a diagram illustrating an example of changes in the position of a focus lens 105 during a minute drive operation in the first embodiment of the present invention.

FIG. 4 is a diagram illustrating an example of changes in the position of the focus lens 105 during a minute drive operation.

In FIG. 4, the control unit 114 obtains, at time $T_A$, an AF evaluation value $AF_A$ generated by the AF signal processing circuit 113 for a focus detection area of image signals generated by the CDS/AGC circuit 107 on the basis of charges accumulated in the image sensor 106 for a period of time A. Then, a minute operation drive moves the focus lens 105 in the direction of an arrow a by a predetermined amount, and the control unit 114 obtains, at time $T_B$, an AF evaluation value $AF_B$ for image signals taken by the image sensor 106 for a period of time B.

Then, the control unit 114 compares the AF evaluation values $AF_A$ and $AF_B$, and keeps moving the focus lens 105 in the forward direction (the same direction as the previous direction, that is, the direction of the arrow a) by a predetermined amount if $AF_A<AF_B$. On the other hand, if $AF_A>AF_B$, the control unit 114 moves the focus lens 105 in the opposite direction (the direction opposite to the previous direction, that is, the direction of an arrow b) by a predetermined amount.

It is to be noted that the travel distance of the focus lens 105 in S304 and S305 in the minute drive operation can be adapted such that the change in focusing state with one movement is not able to be determined when imaging signals are displayed on the display unit 109 or the like. Specifically, the travel distance can be adapted such that the position after moving the focus lens 105 is located in the depth of focus.

Next, the hill-climbing drive operation carried out in S205 of FIG. 2 will be described with reference to a flowchart shown in FIG. 5. It is to be noted that in FIG. 5, the steps for carrying out the same operations as those in FIG. 3 are denoted by the same reference numerals as those in FIG. 3 to omit detailed descriptions thereof.

Also in the hill-climbing drive operation, in the same way as in the minute drive operation, the control unit 114 first sets an AF frame and filter characteristics for the AF signal processing circuit 113, and obtains an AF evaluation value in accordance with the settings (S302). Then, the control unit 114 evaluates the magnitudes of the previously obtained AF evaluation value and the currently obtained AF evaluation value (S303), and bifurcates the processing.

If the currently obtained AF evaluation value is greater than the previously obtained AF evaluation value, the control unit 114, in S504, controls the focus lens drive circuit 111 to apply hill-climbing drive to the focus lens 105, that is, to move the focus lens 105 at a predetermined speed in the same direction as the previous direction (forward direction), and terminates the processing.

On the other hand, if the currently obtained AF evaluation value is the previously obtained AF evaluation value or less, the control unit 114, in S505, determines whether or not the AF evaluation value has passed the peak and decreased. Then, in a case in which it is determined that the AF evaluation value has passed the peak and decreased, the control unit 114 proceeds with the processing to S506 to terminate the processing as a result of passing the peak.

In a case in which it is not determined in S505 that the AF evaluation value has passed the peak and decreased, the control unit 114, in S507, controls the focus lens drive circuit 111 to apply hill-climbing drive to the focus lens 105, that is, to move the focus lens 105 at a predetermined speed in a direction opposite to the previous direction, and terminates the processing.

Figure 6:
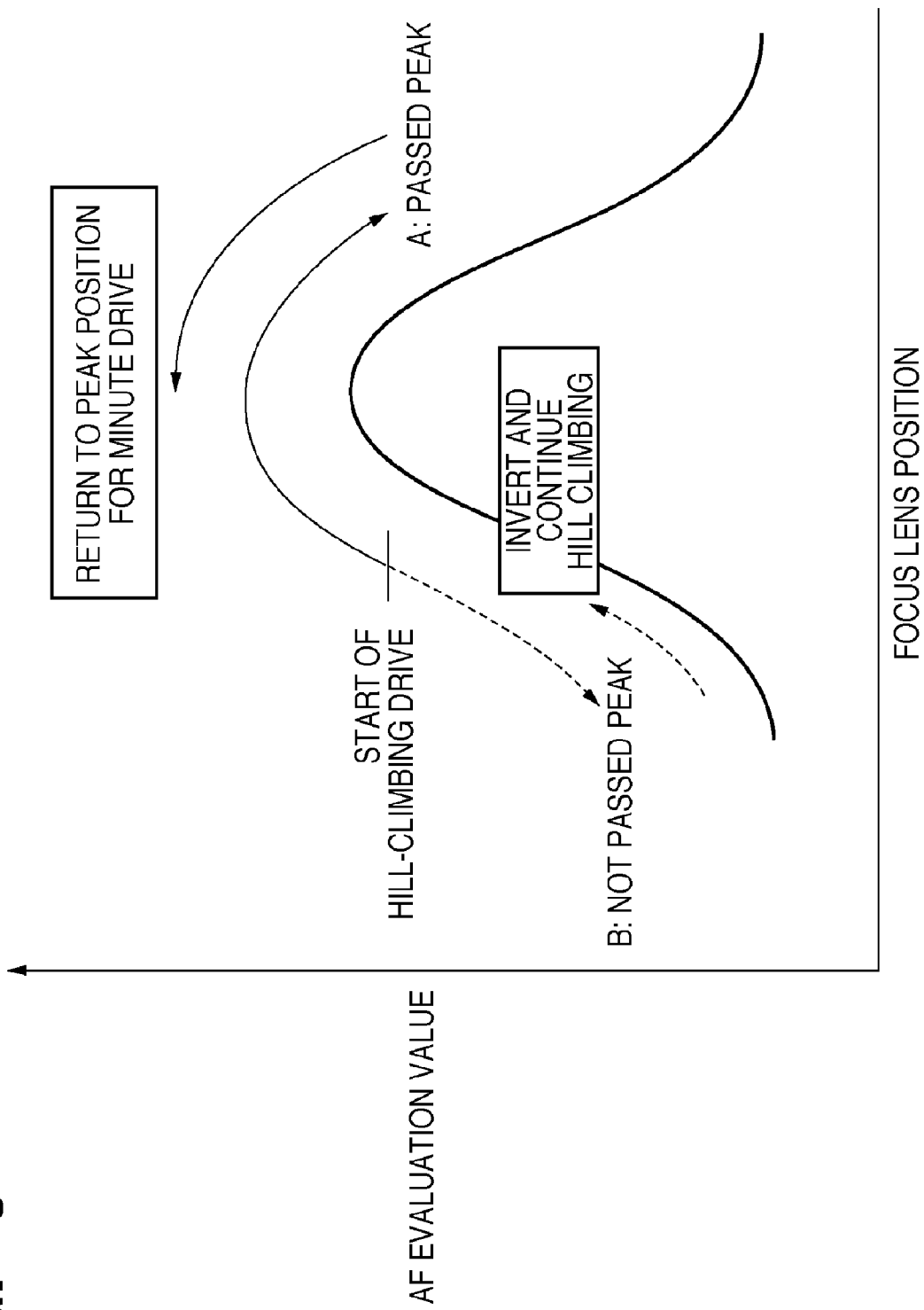
FIG. 6 is a diagram illustrating examples of the magnitude of an AF evaluation value and of drive operation of the focus lens 105, during a hill-climbing drive operation in the first embodiment of the present invention.

FIG. 6 is a diagram illustrating examples of the magnitude of an AF evaluation value and of drive operation of the focus lens 105, during a hill-climbing drive operation.

In FIG. 6, in a case in which the focus lens 105 is driven rightward in the figure from the start position of the hill-climbing drive, it is determined that the AF evaluation value has passed the peak (maximum value) and decreased as indicated by an arrow A. In this case, the hill-climbing drive operation is terminated as a result of passing the focused focal point, and the focus lens 105 is returned to the position at which the maximum value of the AF evaluation value is obtained (S207 and S208 in FIG. 2) to move to the minute drive operation (S202).

On the other hand, in a case in which the focus lens 105 is driven leftward in the figure from the start position of the hill-climbing drive, it is determined that the AF evaluation value has decreased without passing the peak as indicated by an arrow B. In this case, it is determined that the direction of movement of the focus lens 105 is wrong, and the hill-climbing drive operation is continued in the opposite direction. It is to be noted that the travel distance of the focus lens 105 for a given length of time is larger than that during the minute drive operation described above.

As described above, the control unit 114 carries out the AF control operation for moving the focus lens 105 to the position at which the AF evaluation value takes the maximum value while repeating the cycle: the determination of necessity of restart (rerun from minute drive)→minute drive→hill-climbing drive→minute drive→restart determination.

Figure 7:
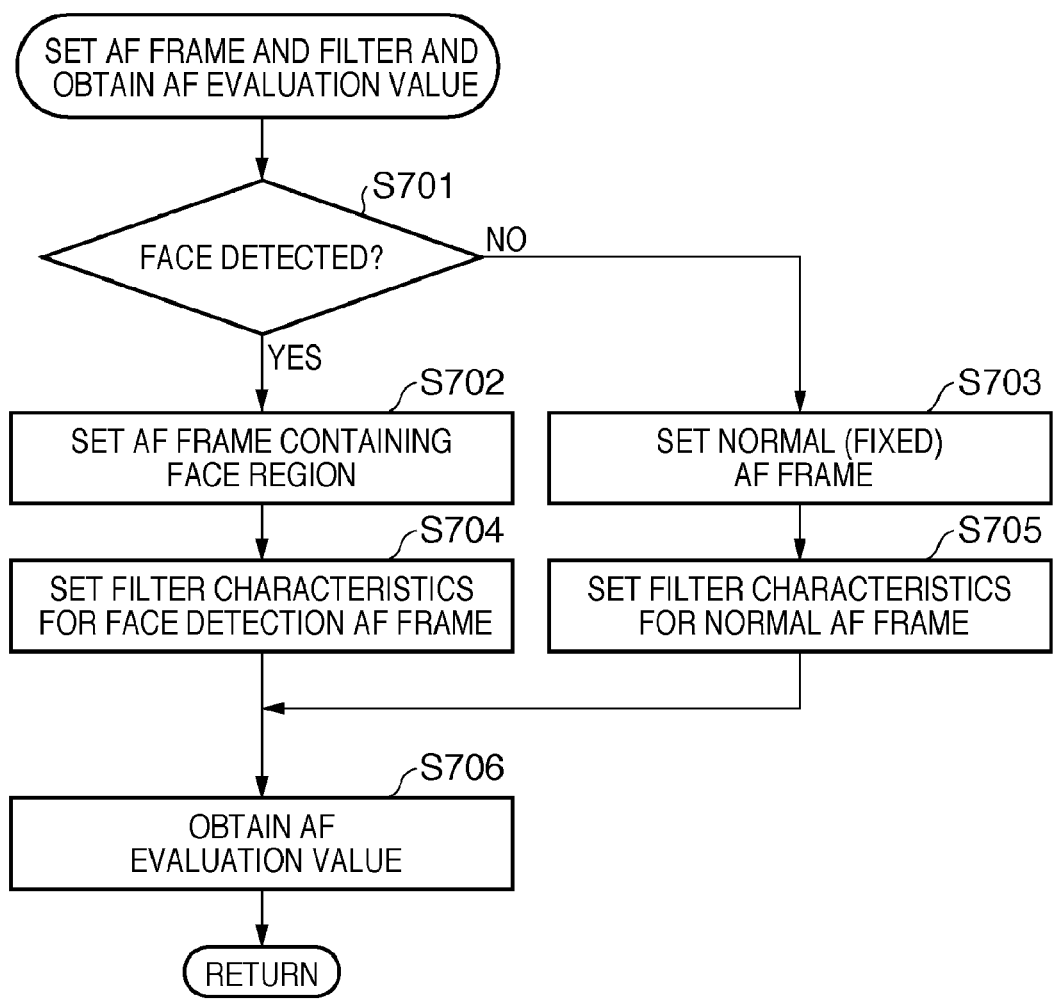
FIG. 7 is a flowchart showing details of AF frame and AF filter settings and of AF evaluation value acquisition processing carried out by the control unit 114 in the first embodiment of the present invention.

Next, details of the AF frame and AF filter settings and of the AF evaluation value acquisition processing in S302 of FIGS. 3 and 5 will be described with reference to a flowchart shown in FIG. 7.

In S701, the control unit 114 determines, from the face detection result obtained from the face detection unit 116, whether or not any person's face has been detected within a shooting range. In a case in which it is determined that a face has been detected, the control unit 114 sets an AF frame (face detection AF frame) for the AF gate 112 in a small region containing the face region in S702. On the other hand, in a case in which it is determined that no face has been detected, the control unit 114 sets a predetermined normal AF frame (fixed AF frame) for the AF gate 112 in S703.

Figure 12A:
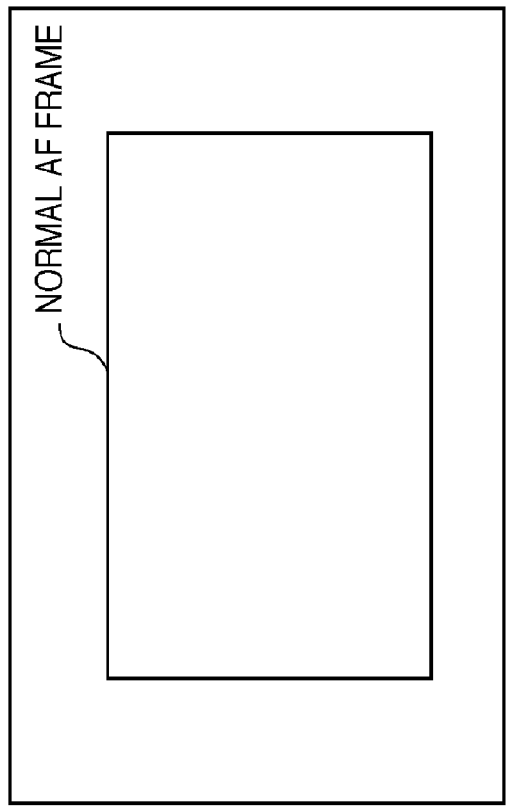
FIGS. 12A and 12B are diagrams illustrating examples of a face detection AF frame and a normal AF frame in the first embodiment of the present invention.
Figure 12B:
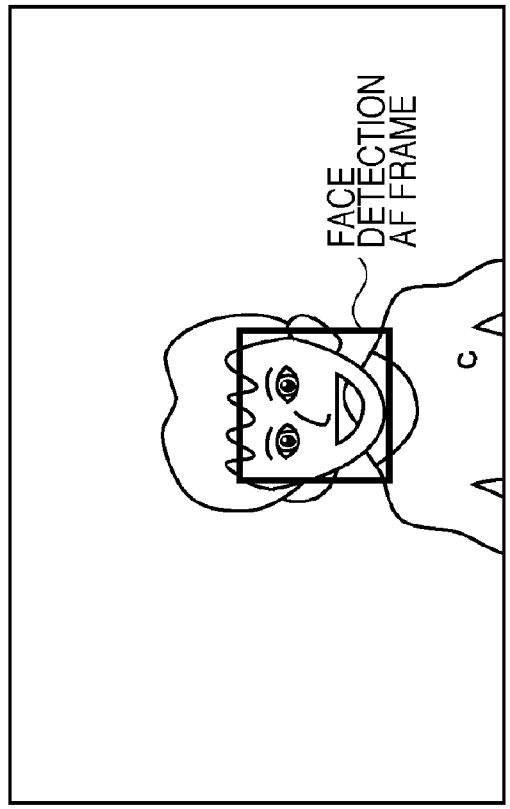

FIGS. 12A and 12B show examples of the face detection AF frame and normal AF frame in the present embodiment.

The face detection AF frame shown in FIG. 12A is set for the detected face region, and may be, for example, contained in the face region, or a rectangular region that circumscribes the face region. The position and size of the face detection AF frame with respect to the face region can be determined in consideration of the size of the face region, etc. However, since the face detection AF frame is set for the purpose of focusing on the face region, it is not preferable that the face detection AF frame contains a lot of regions other than the face region (be too large).

On the other hand, the normal AF frame shown in FIG. 12B is set as a relatively large area in the center of the screen. This is because an object to be intended to be photographed by the photographer is often arranged in the center of the screen, and because a region of the object is not able to be specified without face detection.

In addition, the face detection AF frame is changed in at least its position (center position) of its position and size, following the detected face region, whereas the normal AF frame is fixedly located and has a center position corresponding to the center of the image. The size of the normal AF frame may or may not be fixed.

Figure 8:
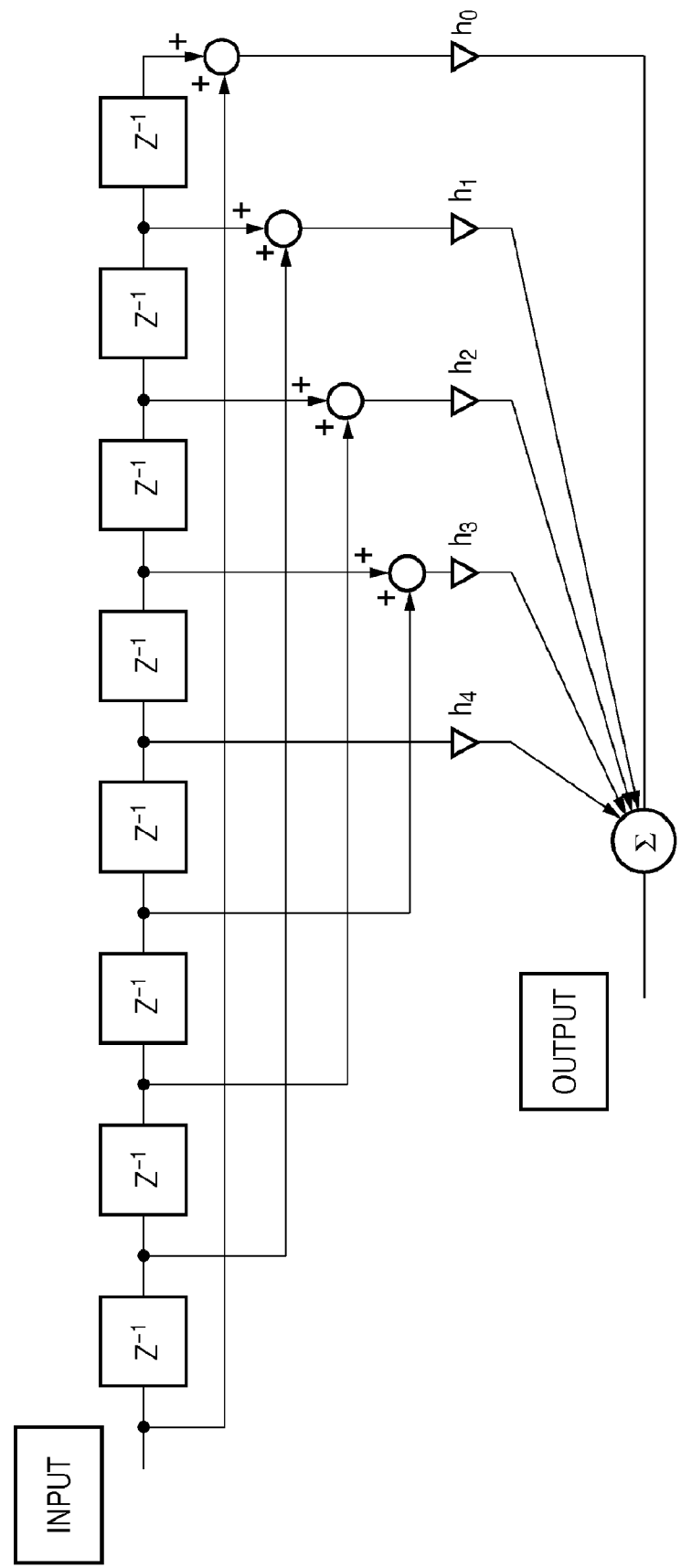
FIG. 8 is a diagram illustrating an FIR digital filter as an example of a filter of an AF signal processing circuit 113 in the first embodiment of the present invention.

When an AF frame is set, the control unit 114 sets, depending on the type of the AF frame, a filter to be used by the AF signal processing circuit 113 in the generation of an AF evaluation value. Specifically, the frequency characteristic settable filter of the AF signal processing circuit 113 is set to have characteristics (frequency characteristics). In a case in which the AF signal processing circuit 113 includes a FIR-type digital filter as shown in FIG. 8, the frequency characteristics of the filter can be changed by changing coefficients h0 to h4. It is to be noted that the filter included in the AF signal processing circuit 113 is not limited to FIR-type digital filters, and may have any configuration such as an IIR type.

In a case in which the face detection AF frame is set, the control unit 114 sets filter characteristics for the face detection AF frame in the AF signal processing circuit 113 in S704. Alternatively, in a case in which the normal AF frame is set, the control unit 114 sets filter characteristics for the normal AF frame in the AF signal processing circuit 113 in S705.

Then, in S706, the control unit 114 obtains an AF evaluation value from the AF signal processing circuit 113 and terminates the processing.

Figure 10A:
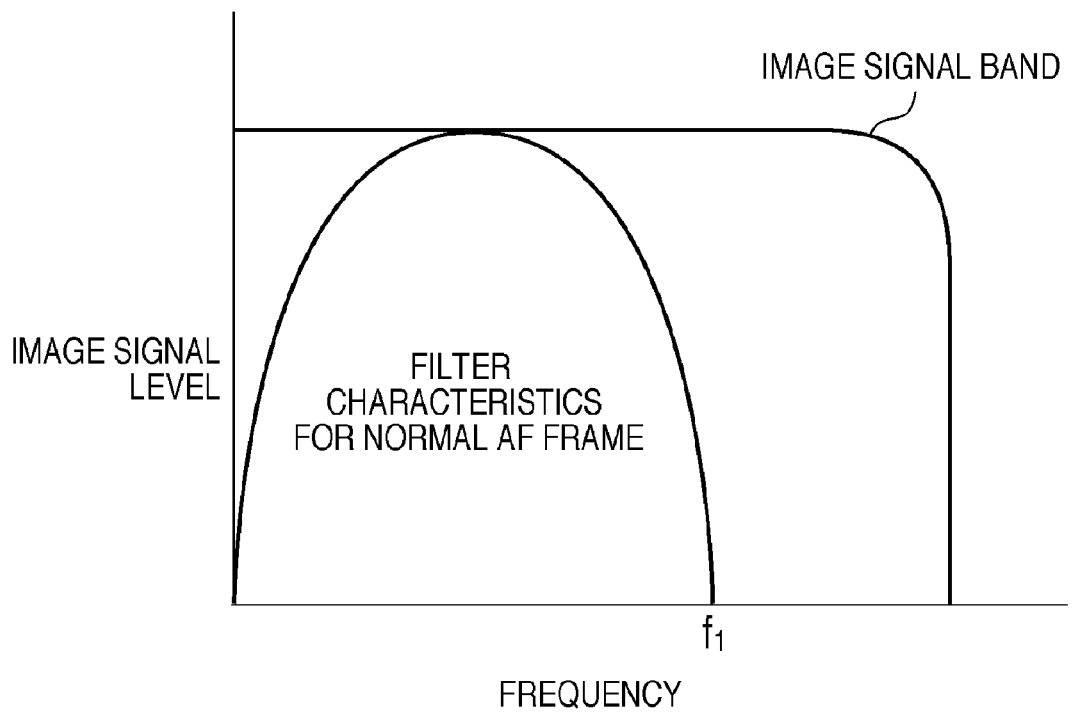
FIGS. 10A and 10B are diagrams showing examples of the relationship between filter characteristics set by the control unit 114 and an image signal band in the first embodiment of the present invention.
Figure 10B:
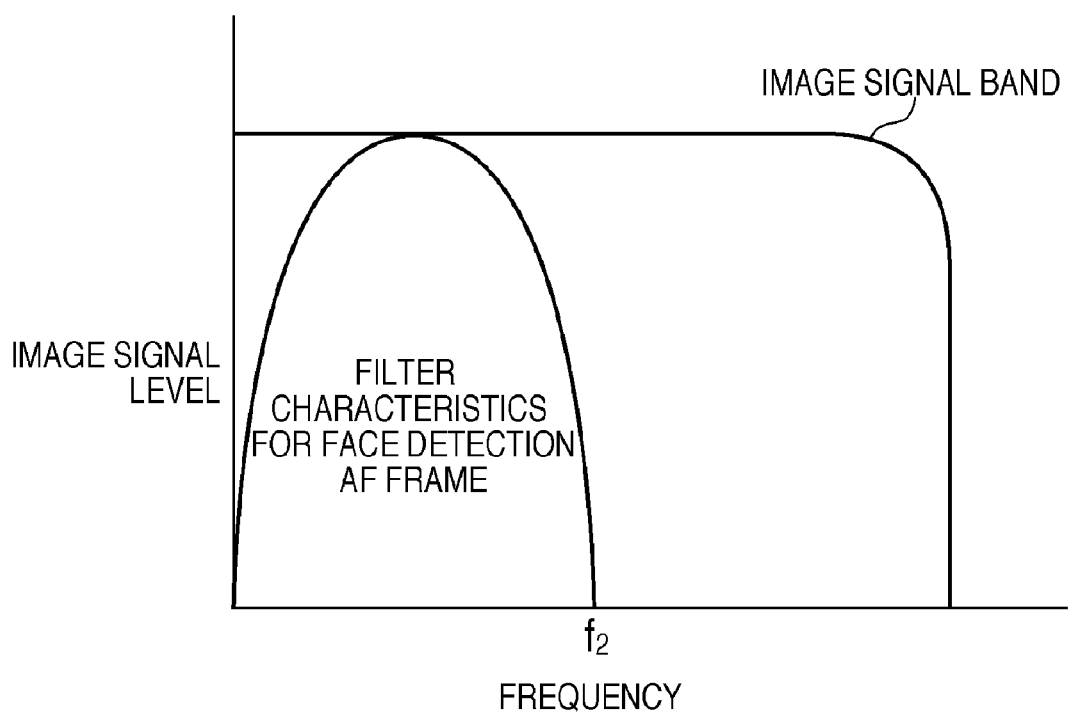

FIGS. 10A and 10B are diagrams showing examples of the relationship between filter characteristics set by the control unit 114 and an image signal band. FIGS. 10A and 10B respectively show an example of filter characteristics for a normal AF frame and an example of filter characteristics for a face detection AF frame.

As shown in FIGS. 10A and 10B, compared to the filter characteristics for the normal AF frame the filter characteristics for the face detection AF frame has a narrow transmission band at the higher frequencies. This means that the filter characteristics are set in order not to transmit high frequency components (components of f2 to f1) which are normally not contained in the face image, because a face region is considered to be present in the face detection AF frame. While it is highly likely that the high frequency components which are normally not contained in the face image are noise components, the magnitudes of the high frequency components have a considerable influence on the AF control. Therefore, in the case of filter characteristics set to extract the high frequency components which are normally not contained in the face image, no consistent AF evaluation value is obtained, resulting in a cause for decrease in accuracy of focusing on the face region.

On the other hand, since it is not clear what object is contained in the normal AF frame, the highest frequency f1 of the frequency band to be extracted is set higher (f1>f2) than for the face detection AF frame.

As described above, in the present embodiment, in a case in which a focus detection area (AF frame) contains a face region in the image capturing apparatus for carrying out face detection, a TV-AF type AF evaluation value is generated on the basis of components in a frequency band lower than in a case in which the AF frame contains no face region. Specifically, the filter characteristics for generating the AF evaluation value are set in such a way that the highest frequency f2 of the components to be extracted is set lower (f1>f2) in a case in which the AF frame contains a face region than in a case in which the AF frame contains no face region. This allows an AF evaluation value particularly for a focus detection area containing a face region to be obtained consistently, improving accuracy of focusing on the face region.

In the present embodiment, the face detection AF frame has been exemplified as an AF frame set for a region of a particular object. However, even in a case in which an AF frame is to be set not only for a person's face but also for a region of any other object, such as another object or a person's other site, it is possible to apply the basic concept of the present invention that an AF evaluation value is generated on the basis of components in a frequency band suitable for properties of the object.

Furthermore, although the present embodiment has been described in such a way that the AF evaluation value is generated for one of the face detection AF frame and the normal AF frame, the normal detection AF frame may be used in addition to the face detection AF frame. In this case, the AF evaluation value can be generated with the use of a filter with different characteristics for each AF frame.

Second Embodiment

Next, a second embodiment of the present embodiment will be described.

Figure 3:
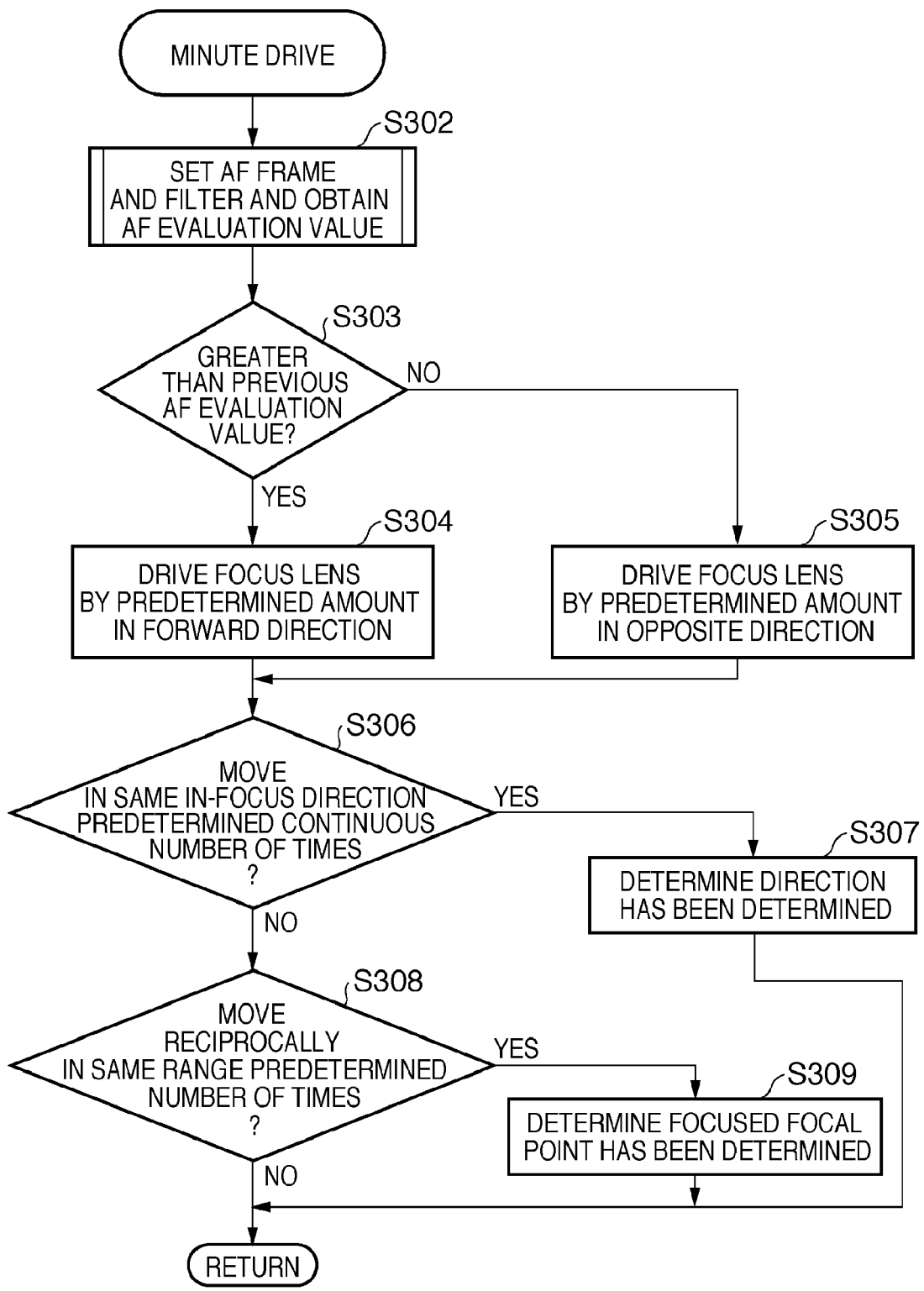
FIG. 3 is a flowchart showing details of a minute drive operation performed by the control unit 114 in the first embodiment of the present invention.
Figure 5:
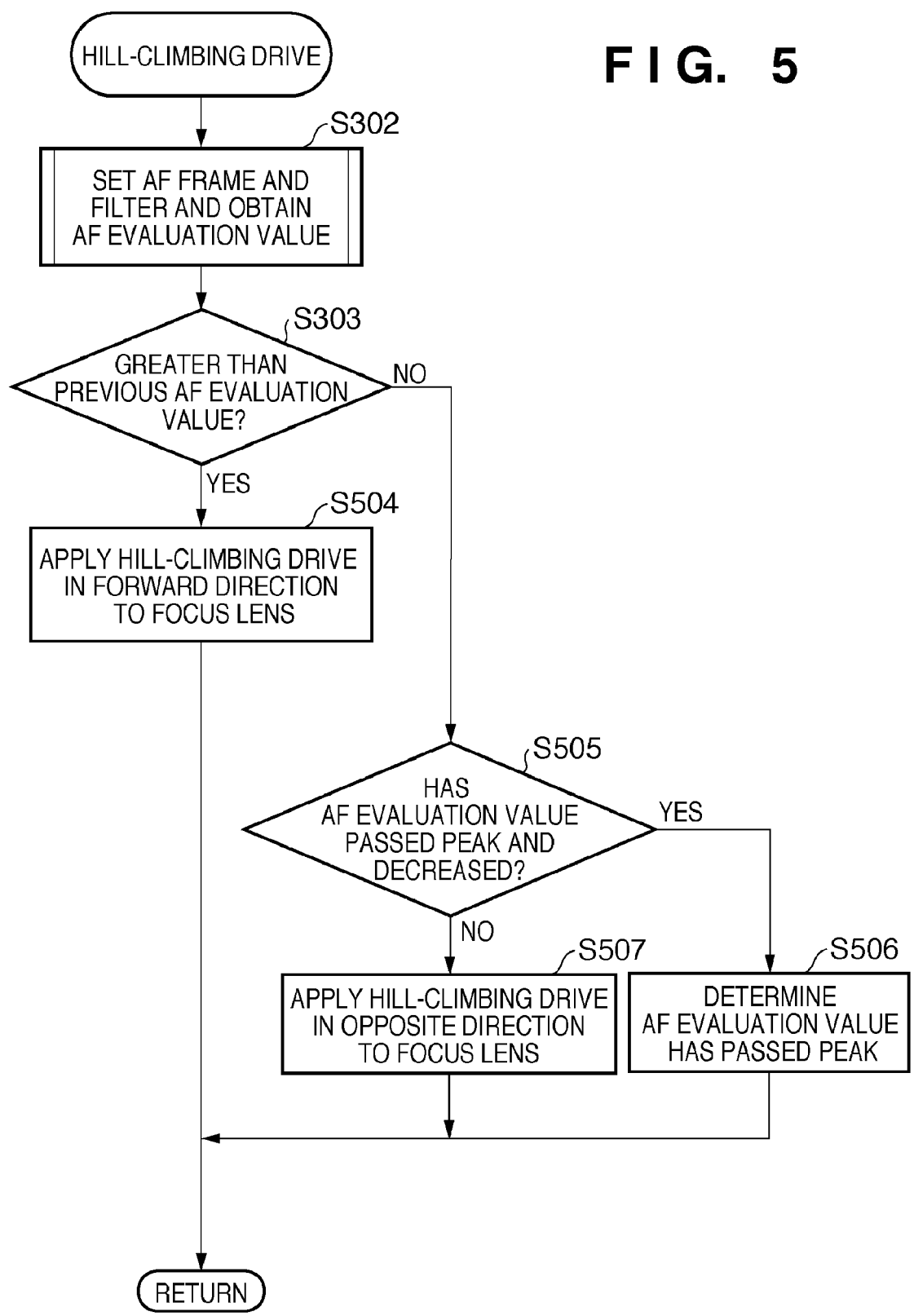
FIG. 5 is a flowchart showing details of hill-climbing drive operation performed by the control unit 114 in the first embodiment of the present invention.

An image capturing apparatus according to the present embodiment differs from the first embodiment in that the AF signal processing circuit 113 has multiple frequency characteristic settable filters, and in the content of the AF frame and filter settings and of the AF evaluation value acquisition processing in S302 of FIGS. 3 and 5. Therefore, the different processing will be described below.

Figure 9:
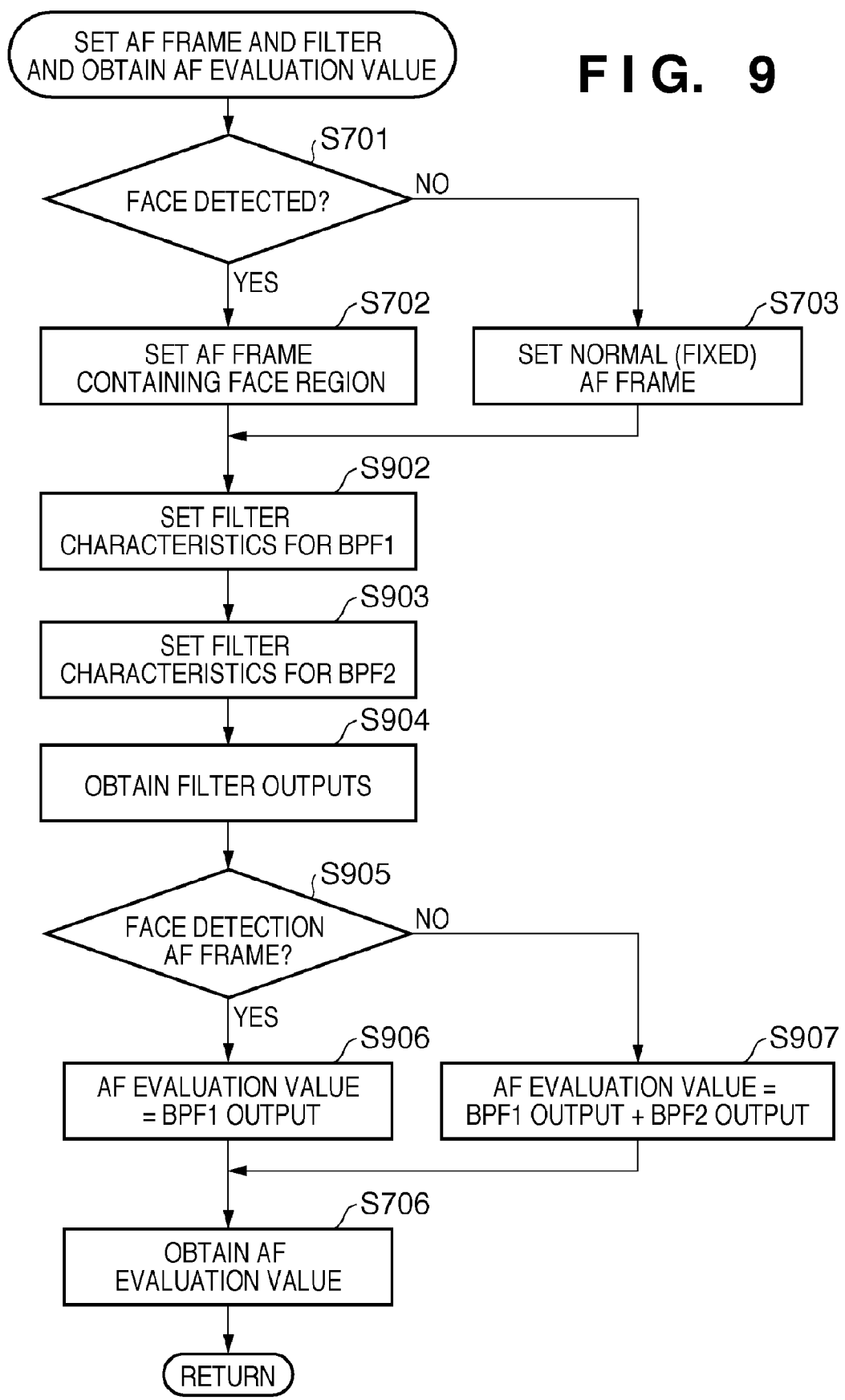
FIG. 9 is a flowchart showing details of AF frame and AF filter settings and of AF evaluation value acquisition processing carried out by a control unit 114 in a second embodiment of the present invention.

FIG. 9 is a flowchart showing details of AF frame and AF filter settings and of AF evaluation value acquisition processing in the image capturing apparatus according to the present embodiment. It is to be noted that the steps in FIG. 9 for carrying out the same operations as those in FIG. 7 are denoted by the same reference numerals to avoid redundant descriptions.

First, the processing up to AF frame setting (S701 to S703) is carried out in the same way as in the first embodiment. In S902, the control unit 114 sets, from the multiple filters of the AF signal processing circuit 113, a first filter (BPF1) for extracting components in a first frequency band (low frequency band). Furthermore, in S903, the control unit 114 sets, from the multiple filters of the AF signal processing circuit 113, a second filter (BPF2) for extracting components in a frequency band (second frequency band) higher than the first frequency band.

Figure 11A:
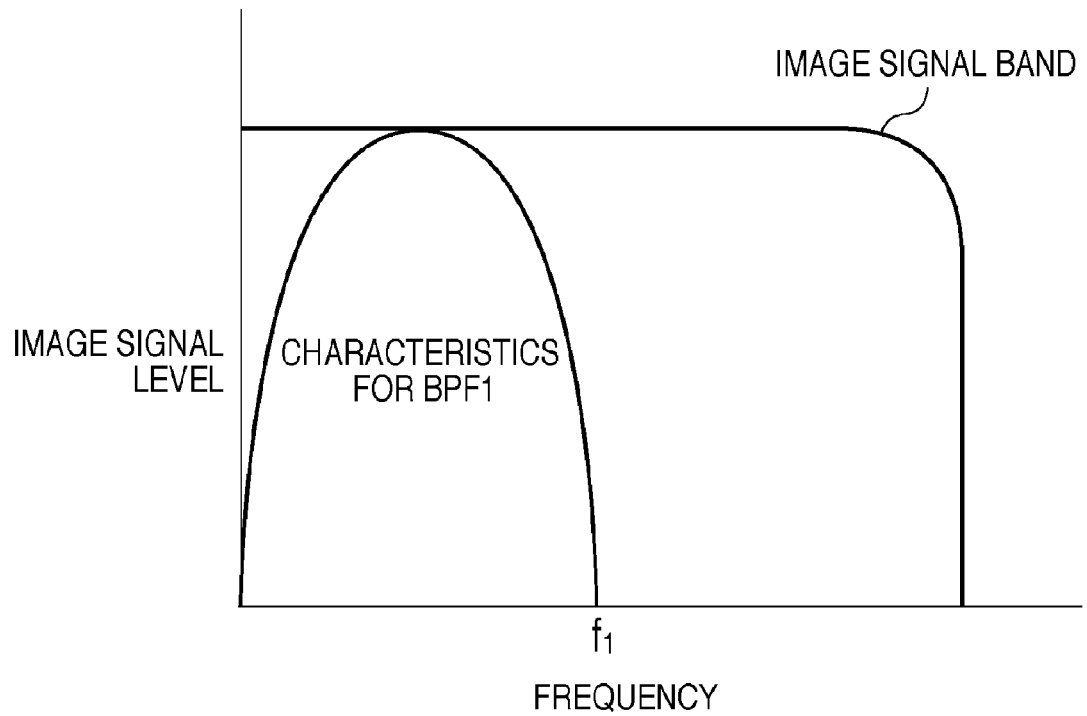
FIGS. 11A and 11B are diagrams showing examples of the relationship between filter frequency characteristics used by an AF signal processing circuit 113 and an image signal band in the second embodiment of the present invention.
Figure 11B:
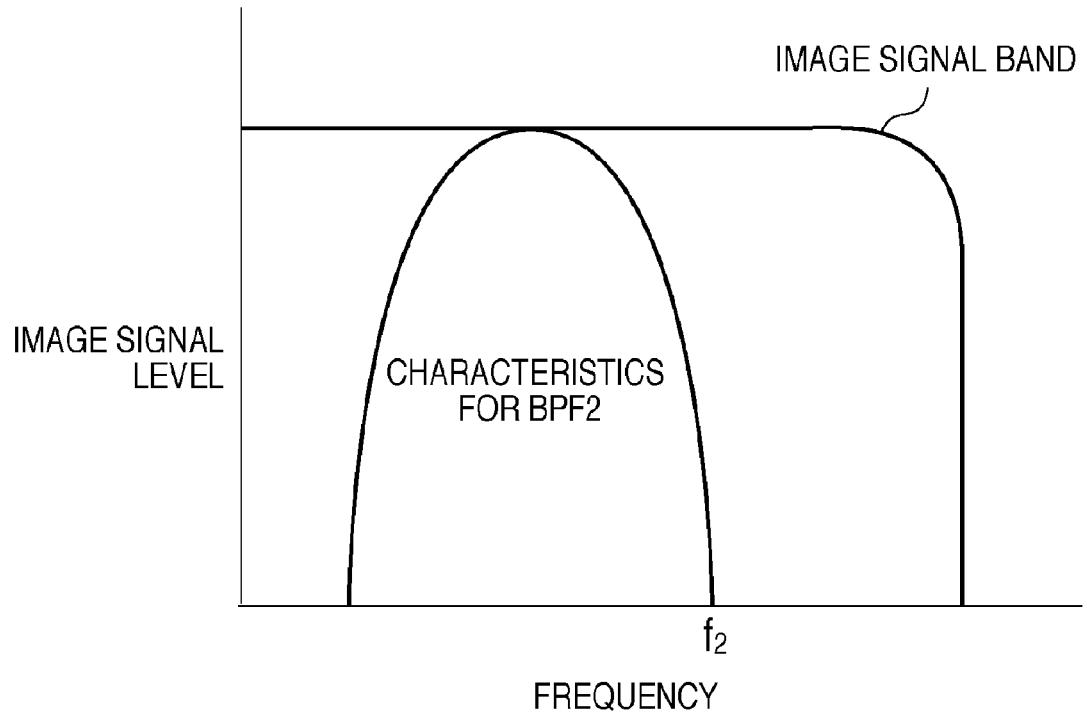

FIGS. 11A and 11B are diagrams showing examples of the relationship between filter frequency characteristics set by the control unit 114 and used by an AF signal processing circuit 113 with respect to an image signal band in the present embodiment and the image signal band.

FIGS. 11A and 11B respectively show an example of characteristics of the first filter (BPF1) for extracting a low frequency band and an example of characteristics of the second filter (BPF2) for extracting a high frequency band. In the present embodiment, the frequency characteristics of BPF1 are equal to the filter characteristics set for the face detection AF frame in the first embodiment. On the other hand, the frequency characteristics of BPF2 correspond to frequency characteristics obtained by shifting the frequency characteristics of BPF1 directly to the higher frequency side by a predetermined amount. In other words, BPF1 and BPF2 have equal transmission bandwidths.

The AF signal processing circuit 113 outputs, as tentative AF evaluation values, the result of applying BPF1 to the AF frame set in S702 or S703 and the result of applying the BPF2 to the AF frame. The control unit 114 obtains the outputs of these filters (S904).

The control unit 114 determines in S905 whether or not the set AF frame is a face detection AF frame.

In the case of a face detection AF frame, the control unit 114 takes the output of BPF1 as a final AF evaluation value in S906. On the other hand, in the case of a normal AF frame, the control unit 114 adds the output of BPF1 and the output of BPF2 to obtain a final evaluation value in S907.

Thus, an AF evaluation value on the basis of components in a frequency band suitable for the face region is obtained for the face detection AF frame in the same way as in the first embodiment. In addition, an AF evaluation value on the basis of components including frequencies higher than for the face detection AF frame can be obtained for the normal AF frame by adding the outputs of BPF1 and BPF2.

As described above, the same advantageous effect as in the first embodiment can be achieved also in the present embodiment. It is to be noted that characteristics are set for each of the multiple filters of the AF signal processing circuit 113 in the present embodiment. However, the AF signal processing circuit 113 may have filters prearranged with different frequency characteristics as shown in FIGS. 11A and 11B. In this case, the control unit 114 has only to give the AF signal processing circuit 113 instructions on what filter is to be used.

In particular, a digital video camera typically has the AF signal processing circuit 113 provided with multiple band-pass filters with different characteristics. Therefore, the present embodiment can be implemented without the need to especially add any new filters, by switching whether or not the band-pass filter for extracting the highest frequency band from among the multiple band-pass filters is used for the generation of the AF evaluation value.

Other Embodiments

The embodiments described above can also be implemented as software by a system or an apparatus computer (or CPU, MPU or the like).

Therefore, a computer program supplied to a computer in order to implement the embodiments described above by such computer itself also implements the present invention. That is, a computer program for implementing the functions of the embodiments described above is itself within the scope of the present invention.

It should be noted that a computer program for implementing the embodiments described above may be in any form provided that it is computer-readable. Such a program may be executed in any form, such as an object code, a program executed by an interpreter, or script data supplied to an OS, but is not limited thereto.

Examples of storage media that can be used for supplying the program are magnetic storage media such as a floppy disk, a hard disk, or magnetic tape, optical/magneto-optical storage media such as an MO, a CD-ROM, a CD-R, a CD-RW, a DVD-ROM, a DVD-R, or a DVD-RW, and a non-volatile semiconductor memory or the like.

As for the method of supplying the program using wire/wireless communications, there is, for example, a method in which a data file (program data file), either a computer program itself that forms the invention or a file or the like that is compressed and automatically installed, and capable of becoming the computer program that comprises the invention on a client computer, is stored on a server on a computer network. The program data file may be in an executable format, or it may be in the form of source code.

Then, the program data file is supplied by downloading to a connected client computer accessing the server. In this case, the program data file may also be divided into a plurality of segment files and the segment files distributed among different servers.

In other words, a server device that provides program data files for implementing the functional processes of the present invention by computer to one or more client computers is also covered by the claims of the present invention.

It is also possible to encrypt and store the program of the present invention on a storage medium, distribute the storage medium to users, allow users who meet certain requirements to download decryption key data from a website via the Internet, and allow these users to decrypt the encrypted program by using the key data, whereby the program is installed in the user computer.

In addition, the computer program for implementing the embodiments described above may utilize the functions of an OS running on the computer.

Further, the computer program for implementing the embodiments described above may in part be constituted as firmware such as an expansion board or the like connected to the computer, or may be executed by a CPU provided on an expansion board or the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-099805, filed on Apr. 7, 2008, which is hereby incorporated by reference herein its entirety.

What is claimed is:

1. An image capturing apparatus for driving a focus lens based on an AF evaluation value obtained from a captured image to carry out autofocus control, comprising:
    a detection unit which detects a particular object from a captured image;
    a setting unit which set a focus detection area for the image;
    a generating unit which generates an AF evaluation value based on a component in a predetermined frequency band contained in the focus detection area of the image; and
    a control unit which drives the focus lens based on the AF evaluation value,
    wherein the setting unit sets the focus detection area for a region of the particular object in a case in which the particular object is detected by the detection unit, and sets the focus detection area for a region in a predetermined position and of a predetermined size in a case in which the particular object is not detected by the detection unit, and
    wherein, in a case in which the focus detection area is set in the region of the particular object, the generating unit generates the AF evaluation value based on a component in a frequency band with the highest frequency lower than in a case in which the focus detection area is set in the region in the predetermined position and of the predetermined size.

2. The image capturing apparatus according to claim 1, wherein the generating unit comprises a filter unit having configurable frequency characteristics, and
    wherein the setting unit sets different frequency characteristics for the filter unit depending on whether the focus detection area is set in the region of the particular object or in the region in the predetermined position and of the predetermined size.

3. The image capturing apparatus according to claim 1, wherein the generating unit comprises a first filter unit for extracting a first frequency band and a second filter unit for extracting a second frequency band including a frequency band higher than the first frequency band, and generates the AF evaluation value using the first filter unit for the focus detection area set in the region of the particular object and using the first filter unit and the second filter unit for the focus detection area in the region in the predetermined position and of the predetermined size.

4. The image capturing apparatus according to claim 1, wherein the center position of the region in the predetermined position and of the predetermined size corresponds to the center of the image.

5. The image capturing apparatus according to claim 1, wherein the detection unit detects a face region of a person as the region of the particular object.

6. A control method for an image capturing apparatus comprising control unit for driving a focus lens based on an AF evaluation value obtained from a captured image to carry out autofocus control, comprising:
    a detection step of detecting a particular object from a captured image;
    a setting step of setting a focus detection area for the image; and a generation step of generating an AF evaluation value based on a component in a predetermined frequency band contained in the focus detection area for the image,
wherein the setting step sets the focus detection area for a region of the particular object in a case in which the particular object is detected in the detection step, and sets the focus detection area for a region in a predetermined position and of a predetermined size in a case in which the particular object is not detected in the detection step, and wherein, in a case in which the focus detection area is set in the region of the particular object, the generation step generates the AF evaluation value based on a component in a frequency band with the highest frequency lower than in a case in which the focus detection area is set in the region in the predetermined position and of the predetermined size.

* * * * *